United States Patent [19]

Biber

[11] Patent Number: 4,651,812

[45] Date of Patent: Mar. 24, 1987

[54] CONTROL APPARATUS FOR VEHICLE AIR CONDITIONING SYSTEM

[75] Inventor: Wolfgang Biber, Eutingen, Fed. Rep. of Germany

[73] Assignee: Daimler-Benz Aktiengesellschaft, Fed. Rep. of Germany

[21] Appl. No.: 573,632

[22] Filed: Jan. 25, 1984

[30] Foreign Application Priority Data

Jan. 25, 1983 [DE] Fed. Rep. of Germany ....... 3302322

[51] Int. Cl.[4] .............................................. F25B 29/00
[52] U.S. Cl. .......................................... 165/25; 165/28; 165/30; 165/43
[58] Field of Search ........................ 165/25, 28, 30, 43, 165/42

[56] References Cited

U.S. PATENT DOCUMENTS

| 4,289,195 | 9/1981 | Bellot et al. ........................ 165/28 X |
| 4,323,111 | 4/1982 | Iijima ................................. 165/25 |
| 4,340,113 | 7/1982 | Iwata et al. ....................... 165/28 X |
| 4,354,547 | 10/1982 | Sugiura .............................. 165/25 |
| 4,391,320 | 7/1983 | Inoue et al. ...................... 165/28 X |
| 4,448,034 | 5/1984 | Shimada et al. .................. 165/25 X |
| 4,450,897 | 5/1984 | Iijima et al. ...................... 165/28 X |
| 4,450,900 | 5/1984 | Nathan ................................ 165/42 |
| 4,476,919 | 10/1984 | Akimoto et al. ................. 165/42 X |

FOREIGN PATENT DOCUMENTS 0060134 4/1982 Japan ..................................... 165/25

Primary Examiner—William R. Cline
Assistant Examiner—Randolph A. Smith
Attorney, Agent, or Firm—Barnes & Thornburg

[57] ABSTRACT

An air conditioning unit comprises a cooling unit and a heating unit and is provided with dehumidifying mode for drying the through-flowing air. The operation of the dehumidifier results in activation of the cooling unit compressor, which reduces the air temperature inside the vehicle. Switching circuits are provided for compensating for this reduction in temperature. The compensation in the switching circuits is dependent on the outside temperature and is ineffective if the cooling unit is running at "full cooling" when the dehumidifier is switched on, or if the outside temperature is below 0 degrees centigrade.

8 Claims, 3 Drawing Figures

CONTROL APPARATUS FOR VEHICLE AIR CONDITIONING SYSTEM

BACKGROUND AND SUMMARY OF THE INVENTION

This invention relates to an apparatus for controlling the inside air temperature of a motor vehicle. The apparatus includes a cooling unit, a heating unit, dehumidifier means for drying the air, and control means which includes circuitry for compensating for temperature changes induced by operation of the dehumidifier means.

An air conditioning arrangement of this type is disclosed in, for example, German published application (DE-OS) No. 29 52 210. This publication describes the basic arrangement of an air conditioning system consisting of a cooling unit having a compressor and an evaporator, a heating unit, and means provided for controlling the heating unit and the compressor of the cooling unit. To dry the air inside the motor vehicle, dehumidifier means can be provided which, when activated, effects the turning on of the compressor independently of the control settings of the air conditioning unit. The moisture in the damp air flowing through the unit is condensed out at the evaporator lamella.

Unless the cooling unit is already operating, the switching on of the compressor by the activation of the dehumidifier means effects a reduction in the inside air temperature due to the through flow of the cooler air. Because the normally used proportional controller for controlling the air conditioning system requires a finite control differential prior to delivery of an output signal, the effective temperature reduction caused by this operation of the compressor is not fully compensated for. In some cases, depending upon the size of proportional regions, the required control differential is approximately two degrees to four degrees centigrade (2° C.–4° C.). Even modern controllers can have large proportional regions requiring differentials in the range of up to 8° C. Accordingly, (DE-OS) No. 29 52 210 provides switching means for adjusting the desired temperature control value simultaneously with the activation of the dehumidifier means. This adjustment of the desired temperature value effects an increase in the vehicle inside air temperature to a middle value that is selected so as to approximately compensate for the effective temperature reduction caused by the operation of the compressor.

However, a disadvantage of this arrangement is that this increase in temperature to a middle value is exact only under certain operational conditions of the air conditioning unit. Under other operational conditions, the resulting temperature increase, which is always a constant value, is too large or too small since the effective temperature reduction resulting from the operation of the compressor is not completely or is too strongly compensated for. A further disadvantage of this known arrangement is that the adjustment in temperature takes place even if the cooling unit is already operating in the "full cooling" mode. Under this condition, the activation of the dehumidifier means does not effect the operation of the cooling unit because the compressor is already running. Therefore, there is no resulting temperature reduction inside the motor vehicle. Nevertheless, the temperature control adjustment is made which leads to a corresponding increase in inside air temperature. The same problem exists if the outside temperature goes below 0° C. To prevent icing of the evaporating lamella, control circuitry discussed below is usually provided to prevent the compressor from running when the temperature is below freezing. A command to switch on the compressor effects, in this case, no further air temperature reduction, yet the constant value temperature control adjustment is made, leading to an increase in the inside air temperature of the vehicle. An object of this invention is to provide an air conditioning unit of the above-mentioned type which avoids these disadvantages. Specifically, the amount of temperature compensation provided should not be a fixed middle value, but rather should depend upon existing driving or operating conditions, i.e., the outside air temperature.

These problems are inventively solved through a circuit corresponding to that shown in FIGS. 2 and 3. As shown there and described below, this invention achieves compensation for the temperature reduction caused by the operation of the compressor upon the activation of the dehumidifier means in an amount which is dependent upon the outside air temperature and which corresponds to the exact temperature reduction which would otherwise occur. It is also achieved, independently of the operating condition of the air conditioning unit, that there is an exact compensation for the temperature increase caused by the activation of the dehumidifying means device.

Upon activation of the dehumidifier means, it is desirable to additively combine the value measured by the outside air temperature detector with a control variable to effect compensation of the switching means controlling the temperature inside the motor vehicle. This additive combination of a control variable with the value measured by the outside air temperature detector can advantageously be performed by a resistance network. This method effectuates a simple solution while utilizing low cost components.

An additional advantageous feature of the invention is that the control variable is allowed to affect the heater controls only if the cooling unit is not already running at "full cooling" when the dehumidifier means is actuated. This is indicated by the absence of a signal at the point in the switching circuit which controls the compressor. With this feature it is possible to prevent an undesired temperature increase. When the compressor of the cooling unit is already running, connection of the dehumidifier means effects no temperature reduction and, thus, compensation would lead to an undesired increase in the inside air temperature of the motor vehicle.

These functions can be effected with a logic circuit. An advantageous arrangement for this purpose includes an operational amplifier, two resistance networks and two diodes. The operational amplifier can be connected as a comparator whereby the value measured by the outside temperature detector is combined with the control variable through a diode only if the dehumidifier means is activated and the cooling unit is not running at "full cooling".

Furthermore, it is especially advantageous to provide additional switching circuitry which allows for connection of the control variable to the heating controls only if the outside temperature is above 0° C. An undesired temperature increase would otherwise result because the command to switch on the compressor, in this case, leads to no further reduction in the temperature of the through-flowing air. It is desirable to construct this additional switching circuit as a resistance network with a diode. This solution exhibits simplicity and economy.

Further objects, features, and advantages of the present invention will become more apparent from the following description when taken with the accompanying drawings which show, for purposes of illustration only, an embodiment in accordance with the present invention.

DETAILED DESCRIPTION OF THE DRAWINGS

Figure 1:
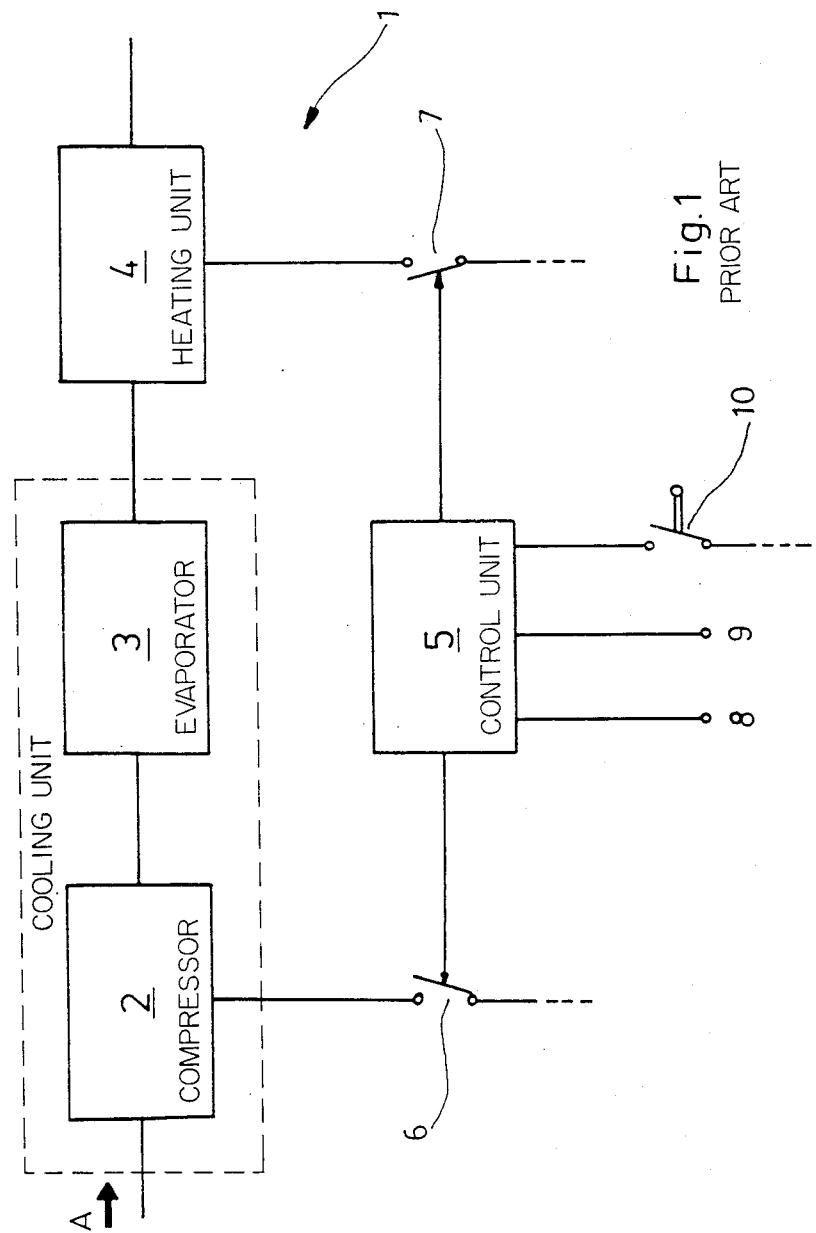
FIG. 1 is a simplified block circuit diagram of a known air conditioning unit of the type toward which the invention is directed, wherein the individual parts are either not shown or only schematically and very simply illustrated.

A known air conditioning arrangment is depicted in FIG. 1 and generally identified by reference character 1, comprising a compressor 2, an evaporator 3 and a heater 4. The individual parts of these devices, for example the condensor belonging to the cooling unit, are not included in this illustration in order to show the overview. Fresh or recirculated air is guided in the direction of the arrow A through the cooling unit formed by the compressor and evaporator and the heater, and then guided to the inside of the vehicle. A control unit 5 can switch on the compressor of the cooling unit with switch 6 and the heater with switch 7. Switch 7 is so illustrated for simplification of the drawing, but could be replaced with a control member which can facilitate a stepless control of the heating unit. The control unit 5 receives signals from an inside air temperature detector 8 and an outside air temperature detector 9 as well as the signal for activating the dehumidifier means by means of switch 10. Other signal inputs, such as the signal from the desired temperature value adjustment or the necessary feedback signals from the heating or cooling units, are not illustrated here to simplify the drawing.

By referring to FIG. 1, the operation of an air conditioning unit provided with dehumidifier means can be illustrated. First consider the case where the inside air temperature is 25° C. and the outside air temperature is 20° C., and wherein control unit 5 receives these values by means of the corresponding temperature detectors 8 and 9. With this temperature differential neither activitation of the cooling unit nor activation of the heating unit is necessary. Thus, switches 6 and 7 are open. Now, if control unit 5 receives, by means of switch 10, the signal to activate the dehumidifier means, it then closes switch 6 which starts the compressor 2 and results in a drying of the air by means of fluid condensation at the lamella of evaporator 3. Because heating device 4 is not activated, colder air is admitted to the inside of the motor vehicle. Control unit 5 can, however, first activate heater 4 by closing switch 7 if the right control differential is present. In this case, the inside air temperature can fluctuate approximately 2° C. to 4° C. with respect to the desired value. Activation of the dehumidifier means effects an air temperature reduction inside the vehicle. Therefore, means are provided in control unit 5 which, upon activation of the dehumidifier means and compressor 2, causes the inside air temperature to increase by a fixed amount, for example, 2° C., to a middle value. In the present example, complete compensation for the temperature reduction caused by the activation of the dehumidifier means can be achieved by proper selection of this temperature increase. This value of temperature increase cannot however, be correct for all cooling unit operating conditions, as illustrated by the following example.

The inside air temperature is again 25° C. and the outside air temperature is now 10° C. In this case, heater 4 is activated by control unit 5 by means of switch 7. Now if the dehumidifier means is activated due to the closing of switch 10, activation of compressor 2 by means of the switch 6 will certainly cool the outside or recirculated air traveling in the direction of the arrow A, but, because heater 4 is operating, the air will not be so strongly cooled as in the earlier described instance where the outside air temperature was 20° C. The resulting temperature reduction would also be smaller, for example, 1° C. However, because the control unit provides for a fixed temperature increase of 2° C., an effective increase in the vehicle inside air temperature results. It is, therefore, an object of the present invention to provide an air conditioning arrangement which provides complete compensation for the temperature variations resulting from activation of the dehumidifier means, irrespective of variable operating conditions.

In another hypothetical situation, the inside air temperature is 25° C. and the outside air temperature is 30° C. Control unit 5 would in this case close switch 6 and activate compressor 2 of the cooling unit. If the command for dehumidifier means is now given by switch 10, the temperature of the air flowing to the inside of the vehicle does not change at all because compressor 2 is already running. In spite of this, a temperature increase is induced by the fixed value compensation which, on the basis of the example discussed above, will result in an increase of 2° C. in the inside air temperature. This temperature increase can be prevented by an inventive air conditioning arrangement.

Corresponding relationships exist if the inside air temperature is 25° C. and the outside air temperature is −5° C. Activation of the dehumidifier means in this case does not result in any further cooling of the flow of air because the evaporator temperature cannot sink below 0° C. Thus, in this case too, a fixed value temperature increase, for example, 2° C., would result in too high a temperature inside the vehicle. This result can be prevented by an inventive air conditioning arrangement.

Figure 2:
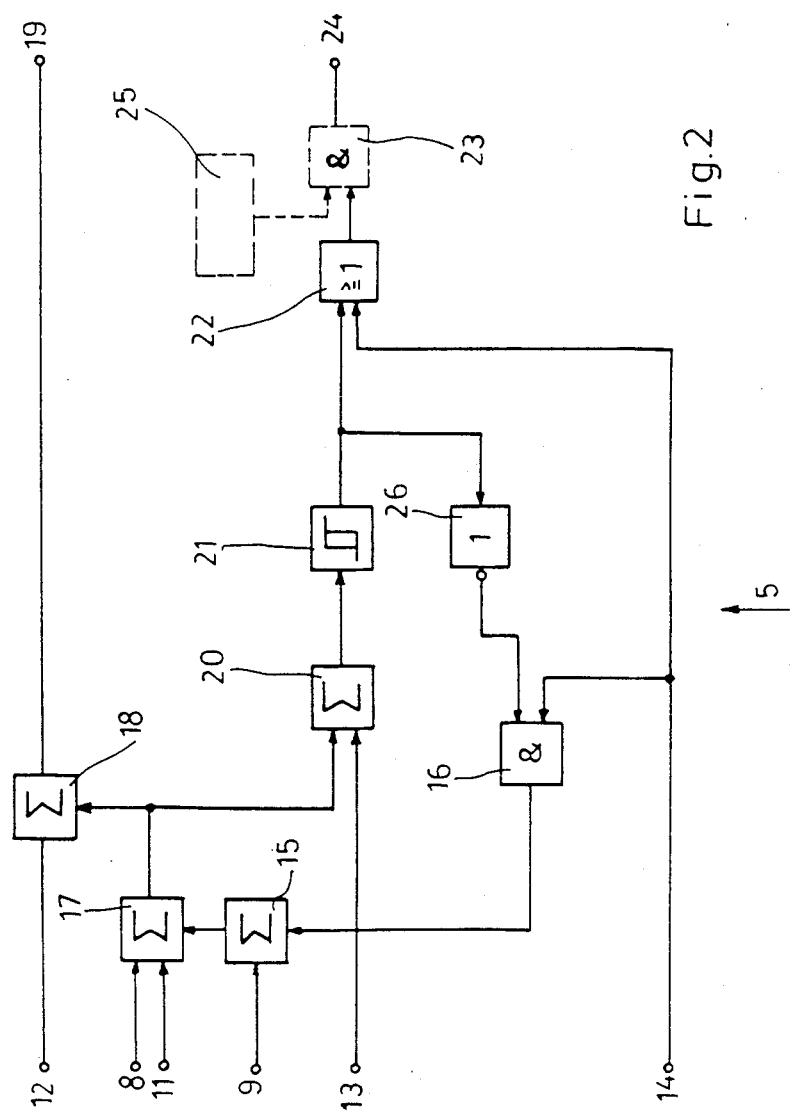
FIG. 2 is a block circuit diagram of an inventive air conditioning control circuit arrangement.

FIG. 2 is a block circuit diagram of a complete control unit 5 constructed in accordance with the present invention. This control unit receives signals from different measurement devices, such as the inside air temperature detector 8, the outside air temperature detector 9, the desired temperature value adjuster 11, the feedback device 12 arranged at the heater unit which, for example, can be constructed as a heat exchanger temperature detector or mixing valve flap sensor, and the feedback device 13 arranged at the cooling unit, which, for example, can be an evaporator temperature detector. Furthermore, the command for activating the dehumidifier means can be received via the contact 14.

In summing device 15, the signal from the outside air temperature detector 9 is added to the output signal of AND gate 16, described below. The output signal of summing device 15 arrives at an input of summing device 17 and is added to the signal received from inside air temperature detector 8 and the desired temperature value adjuster 11. The output signal of this summing device is connected to the input of summing device 18 where it is added to the value measured by feedback device 12 in the heating circuit, for example, the heat exchanger detector. The output of the summing device 18 is connected by means of contact 19 to the heating device 4, for example, to a water valve not illustrated here. The output signal of summing device 17 is also connected to the input of summing device 20 where it is added to the value measured by feedback device 13 arranged at the cooling unit, for example, the evaporator temperature detector. The output of summing device 20 is connected via Schmitt-trigger 21 to OR gate 22 and from there to contact 24, whereby a logic "1" signal at contact 24 causes activation of the compressor 2. Optional AND gate 23 (shown in dashed lines) can be provided between OR gate 22 and contact 24. The second input of this AND gate is connected to logic circuit 25 (not further illustrated here) which shuts off the compressor when the evaporator temperature reaches 0° C. in order to prevent icing of the evaporator lamella. The occurrence of a logic "1" signal at the output of Schmitt-trigger 21, does not necessarily mean that the compressor will actually be switched on. The compressor may already be running due to prior activation of the dehumidifier means. Continued running of the compressor after operation of the dehumidifier means indicates that the cooling unit is functioning in the "full cooling" mode. Therefore, this signal is connected through invertor 26 to an input of AND gate 16 whose output is connected to summing device 15, as described above. The second input of AND gate 16 is connected to contact 14 whereby the existence at this contact of a logic "1" signal results from a command to activate the dehumidifier means. Contact 14 is also connected to the second input of OR gate 22.

The circuit operates in the following manner:

Heater 4 is controlled by summing devices 15, 17, and 18, while the compressor of the cooling unit can be switched on and off by summing devices 15, 17, and 20, the Schmitt-trigger and logic gates 22 and 23. As long as the dehumidifying means apparatus is not activated there is a logic "0" signal at contact 14 and, accordingly, at the corresponding inputs of AND gate 16 and OR gate 22, whereby this switching branch is not active. In this case there is a logic "0" at the output of AND gate 16 and, accordingly, at the corresponding input of summing device 15, also.

If the dehumidifier means is now activated, a logic "1" signal exists at contact 14 and operates via OR gate 22, to activate the compressor 2 independently of whether a logic "1" signal exists at the output of the Schmitt-trigger 21, unless compresser activation is prevented by the icing protection circuit 25. Simultaneously, a compensating signal appears at an input of summing device 15 via AND gate 16, unless a logic "1" signal exists at the output of the Schmitt-trigger 21 indicating that the cooling unit is functioning at "full cooling."

The relationship between AND gate 16 and summing device 15 is so designed that a summing product occurs only if the outside air temperature detector 9 delivers a value indicating an outside air temperature of more than 0° C. If this is the case, the measured value of the outside air temperature influences, via summing device 15, the direct compensation for the temperature reduction which follows activation of the dehumidifier means. As already explained, this temperature compensation functions only if the cooling unit is not operating in the "full cooling" mode, i.e., if there is no logic "1" signal at the output of Schmitt-trigger 21. This feature is provided by means of invertor 26 and AND gate 16. Thus, no distinction is made between cases in which the compressor 2 is actually running and in cases in which activation is prevented by the icing protection circuit 25.

Figure 3:
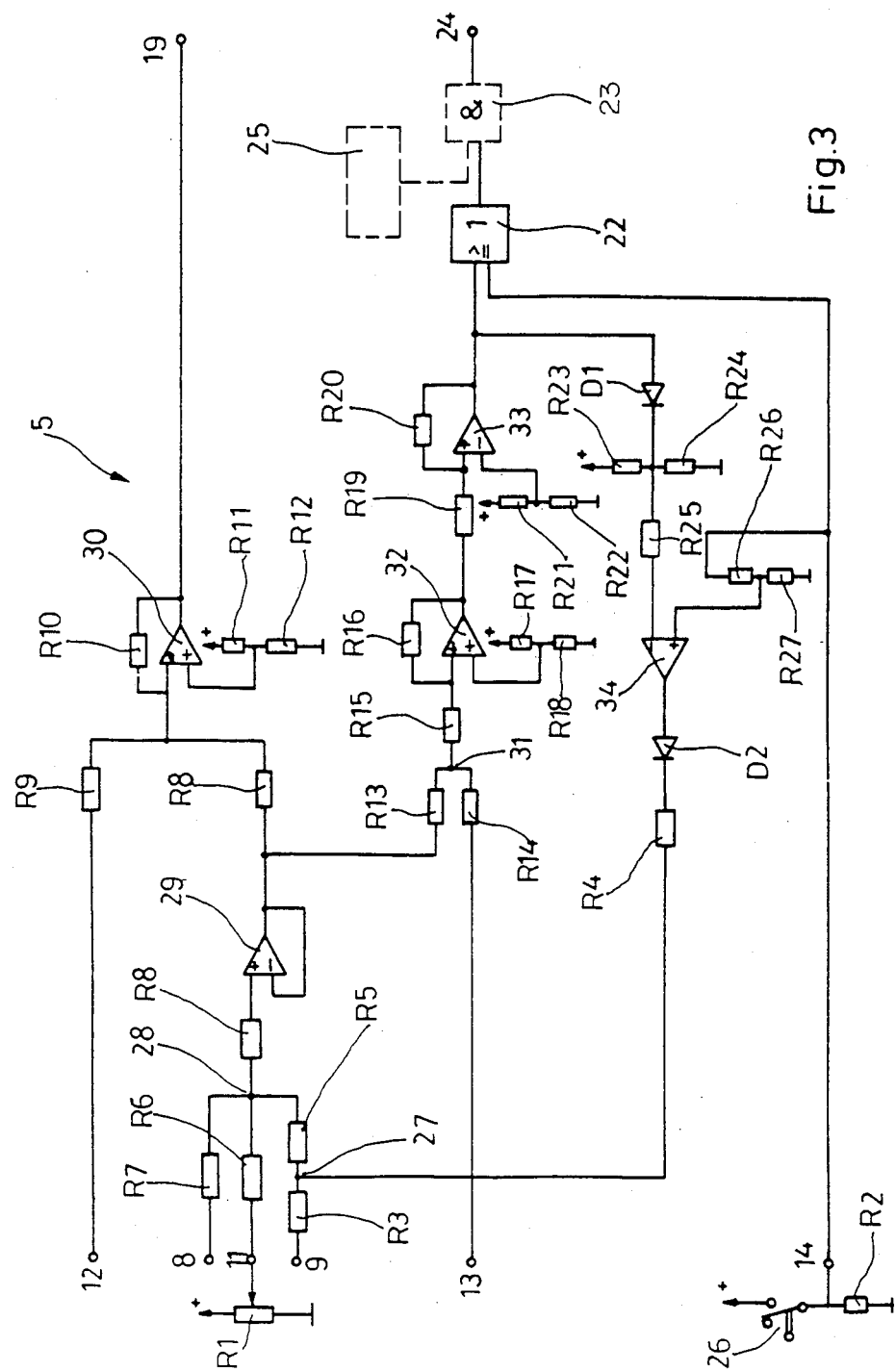
FIG. 3 is an electrical circuit which represents an embodiment of the block circuit diagram of FIG. 2.

In FIG. 3 there is shown an embodiment of the block circuit diagram of FIG. 2 in the form of an electrical circuit. For the inputs and outputs of control unit 5 the same reference numbers are used as in FIG. 2 to simplify the description presented here. Illustration is expanded for only two of the inputs: contact 11 is shown connected to the desired temperature value adjuster, which in this example is depicted as potentiometer $R_1$. Further, the signal which indicates activation of the dehumidifier means is produced by the closing of a changeover switch 26. When the changeover switch is open, contact 14 is connected via a resistance $R_2$ to ground whereby a logic "0" signal results and the logic which responds to activation of the dehumidifier means is disabled. The closing of changeover switch 26 results, on the other hand, in a logic "1" signal at contact 14 providing a voltage illustrated by the plus sign when the dehumidifier means is activated.

At summing point 27 the voltage across the resistances $R_3$ and $R_4$ is added. This summing point corresponds to summing device 15 shown in FIG. 2. A second summing point 28, which corresponds to summing device 17 in FIG. 2, adds the voltage drops occurring across the resistances $R_5$, $R_6$, and $R_7$. These added signals appear, via a resistance $R_8$, at operational amplifier 29, connected as a voltage follower. This operational amplifier prevents reverse coupling of the rest of the circuit to summing point 28 and allows the output of summing point 28 to be low impedance. Connected to the output of operational amplifier 29 is another summing device, which corresponds to summing device 18 in FIG. 2, which includes operational amplifier 30. This operational amplifier sums, via the resistances $R_8$ and $R_9$, the output signal of operational amplifier 29, and the value measured by the heating unit feedback device 12 which, for example, can be constructed as a heat exchanger temperature detector or mixing valve flap sensor. A resistance $R_{10}$ provides feedback for operational amplifier 30 at its inverted input, while the not inverted input is connected to a voltage divider formed by the resistances $R_{11}$ and $R_{12}$. The output signal of operational amplifier 30 can now be connected directly, or through an additional switch to the heating controller, for example, to control a water valve.

The cooling unit regulating circuit consists of another switching path. At a summing point 31, which corresponds to summing device 20 in FIG. 2, the voltage drops across resistances $R_{13}$ and $R_{14}$, which are connected to the output of operational amplifier 29 and to cooling unit feedback device 13, respectively, are added. Cooling unit feedback device 13 can be, for example, an evaporator temperature detector. This signal is amplified by operational amplifier 32, which is connected to the resistance $R_{15}$ and $R_{16}$ at its inverted input and to a voltage divider formed from the resistances $R_{17}$ and $R_{18}$ at its not inverted input. Another operational amplifier 33 is connected to the resistance $R_{19}$ and $R_{20}$ and to a voltage divider formed by resistances $R_{21}$ and $R_{22}$ to form a Schmitt-trigger. The Schmitt-trigger has the reference character 21 in FIG. 2 and holds the evaporator at the desired temperature in order to maintain the inside air temperature at the adjusted value. The OR gate 22, the AND gate 23, and the icing protection circuits 25 are not further illustrated in this embodiment and correspond to the illustration shown in FIG. 2. A feedback path is formed by a diode $D_1$ and two resistances $R_{23}$ and $R_{24}$ connected as a voltage divider. An additional resistance $R_{25}$ connects the cooling unit regulating signal to the inverted input of operational amplifier 34. The not inverted input of this operational amplifier is connected to two resistances $R_{26}$ AND $R_{27}$ which form a voltage divider whereby a voltage signal is produced when the dehumidifier means is activated. The output of operational amplifier 34 is connected through diode $D_2$ and resistance $R_4$ to summing point 27 in the manner previously described.

When changeover switch 26 is open there is a null potential at the voltage divider formed by resistances $R_{26}$ and $R_{27}$ and, therefore, at the not inverted input of operational amplifer 34. On the other hand, there is a positive voltage at the inverted input of this operational amplifier. This is certainly true when the cooling unit regulator circuit, i.e., operational amplifier 33, delivers 0 volts or a negative voltage, because diode $D_1$ in this case is non-conductive. If operational amplifier 33 has a positive voltage at its output, corresponding to the command "full cooling", after activation of the dehumidifier means, diode $D_1$ is conductive. The voltage at the inverted input of the operational amplifier 34 is, in both cases, higher than the voltage at the not inverted input, whereby the output of this operational amplifier is 0 volts or a negative voltage which means that diode $D_2$ is turned off and the summing point 27 does not receive the compensating control signal. Now, if the dehumidifier means is activated through the closing of changeover switch 26, there exists a logic "1" signal at OR gate 22 and at contact 24, which results in activation of the compressor 2. This activation can, of course, be prevented by the icing protection circuit 25 and AND gate 23, if these are provided. Simultaneously, the voltage dividers $R_{26}$ and $R_{27}$ are provided with a positive voltage. The values of resistances $R_{23}$ to $R_{27}$ are selected such that as long as the diode $D_1$ is non-conducting, the voltage drop across resistance $R_{24}$ is smaller than the voltage drop across resistance $R_{27}$. Should the compressor be deactivated by the cooling unit regulating circuit, which will turn off diode $D_1$, the output of the operational amplifier 34 is brought to a positive potential. This results in a voltage drop across resistance $R_4$ connected to summing point 27, whereby compensation which is dependent on the outside air temperature, for the undesired inside air temperature increase, is effected. However, if the cooling unit is already functioning in the "full cooling" mode, there is a positive voltage at the output of operational amplifier 33, whereby the diode $D_1$ is conductive. The voltage drop across resistance $R_{24}$ is now larger than the voltage drop across resistance $R_{27}$, whereby the output of the operational amplifier 34 is at 0 volts or a negative voltage making diode $D_2$ non-conducting, thus preventing the compensating voltage from being applied to summing point 27. Both resistance networks $R_{23}$ to $R_{25}$ and $R_{26}$ to $R_{27}$, the operational amplifier 34 and the two diodes $D_1$ and $D_2$ form a logic circuit, designated in FIG. 2 by reference characters 16 and 26, which prevents compensation of the circuit upon activation of the dehumidifier means if the cooling unit is already running at "full cooling."

Provision of the summing point 27 assures that the degree of compensation supplied upon activation of the dehumidifier means is dependent upon the outside air temperature.

The resistances $R_3$ and $R_4$ are selected such that, when the outside temperature is below 0° C., the voltage at point 9 is larger than the voltage across resistance $R_4$ and diode $D_2$, which voltage corresponds to the output voltage of operational amplifier 34 minus the voltage drop across diode $D_2$. Thus, this diode is nonconducting. This feature prevents the control voltage from reaching summing point 27 if the outside air temperature is below the freezing point. Thus, no compensation is supplied.

What is claimed is:

1. Apparatus for regulating an inside air temperature of a vehicle, comprising:
   a heating unit and a cooling unit arranged in an airflow path which communicates a flow of air to the inside of the vehicle; said cooling unit having a full cooling mode wherein said cooling unit is operated continuously
   dehumidifying means arranged in the air-flow path for removing moisture from the flow of air;
   means for controlling operation of the dehumidifying means;
   means for producing a first control voltage indicative of a desired inside air temperature;
   means for producing a second control voltage indicative of the actual inside air temperature;
   control circuit means for producing a compensating control voltage, having a magnitude which is dependent upon an outside air temperature, when the dehumidifying means is operating in a dehumidifying mode and the cooling unit is not operating in the full cooling mode;
   control means for controlling the heating and cooling units in response to said first, second and compensating control voltages.

2. Apparatus according to claim 1, wherein said means for producing a compensating control voltage includes means for producing a voltage indicative of the outside air temperature, means for producing a voltage indicative of the operational state of the dehumidifying means, and means for summing said voltages to produce the compensating control voltage.

3. Apparatus according to claim 2, wherein said means for summing said voltages includes a resistance network.

4. Apparatus according to claim 1, wherein said cooling unit includes a compressor and an evaporator, and wherein said means for producing a compensating control voltage includes logic means for producing a logic level voltage indicative of the operational state of the dehumidifying means.

5. Apparatus according to claim 4, wherein said logic means includes means for preventing production of said logic level voltage when the compressor is operating.

6. Apparatus according to claim 5, wherein said logic means comprises an operational amplifier, two resistance networks, and two diodes.

7. Apparatus according to claim 1, further comprising means for preventing said control means from responding to said compensating control voltage when the outside air temperature is below 0° C.

8. Apparatus according to claim 7, wherein said means for preventing said control means from responding comprises a resistance network and a diode.

* * * * *